(12) United States Patent
Simser

(10) Patent No.: US 6,314,429 B1
(45) Date of Patent: Nov. 6, 2001

(54) BI-DIRECTIONAL CONVERSION LIBRARY

(75) Inventor: David Simser, Nepean (CA)

(73) Assignee: Mitel Corporation, Ontario (CA)

( * ) Notice: Subject to any disclaimer, the term of this patent is extended or adjusted under 35 U.S.C. 154(b) by 0 days.

(21) Appl. No.: 09/159,161

(22) Filed: Sep. 23, 1998

Related U.S. Application Data

(60) Provisional application No. 60/061,338, filed on Oct. 8, 1997.

(30) Foreign Application Priority Data

Oct. 8, 1997 (GB) ................................................ 97213530

(51) Int. Cl.$^7$ ....................................................... G06F 17/00
(52) U.S. Cl. ........................... 707/103; 707/10; 707/104; 717/2; 717/4; 717/5; 717/6
(58) Field of Search .................. 707/1, 2, 10, 4, 707/103, 104, 203; 709/315, 316, 332, 219; 717/1, 2, 4, 5, 7

(56) References Cited

U.S. PATENT DOCUMENTS

| | | | |
|---|---|---|---|
| 5,481,712 | * | 1/1996 | Silver et al. .............................. 717/1 |
| 5,734,907 | * | 3/1998 | Jarossay et al. ......................... 717/8 |
| 5,757,925 | * | 5/1998 | Faybishenko ........................ 709/203 |
| 5,872,973 | * | 2/1999 | Mitchell et al. ...................... 709/332 |
| 5,889,992 | * | 3/1999 | Koerber ................................... 717/2 |
| 5,960,200 | * | 9/1999 | Eager et al. .............................. 717/5 |
| 5,966,702 | * | 10/1999 | Fresko et al. ............................. 707/1 |
| 5,970,490 | * | 10/1999 | Morgenstern .......................... 707/10 |
| 5,995,974 | * | 11/1999 | Anton et al. .......................... 707/103 |
| 5,999,972 | * | 12/1999 | Gish ..................................... 709/219 |
| 6,023,698 | * | 2/2000 | Lavey, Jr. et al. ..................... 707/10 |
| 6,066,181 | * | 5/2000 | DeMaster ................................ 717/5 |
| 6,081,665 | * | 6/2000 | Nilsen et al. ............................. 717/5 |
| 6,122,627 | * | 9/2000 | Carey et al. ............................. 707/4 |

FOREIGN PATENT DOCUMENTS 0 803 806 A2    10/1997  (EP) .

\* cited by examiner

Primary Examiner—Hosain T. Alam
Assistant Examiner—Anh Ly
(74) Attorney, Agent, or Firm—Keating & Bennett, LLP

(57) ABSTRACT

A bi-directional conversion library is provided for translating data structures used in a computer program from a first computer programming language to data structures used by a second computer programming language. In the preferred embodiment, a conversion library is provided for converting between Java™ and C. The conversion library of the present invention allows existing computer programs to be reused, thereby reducing the effort required to integrate newly written programs to existing systems.

16 Claims, 1 Drawing Sheet

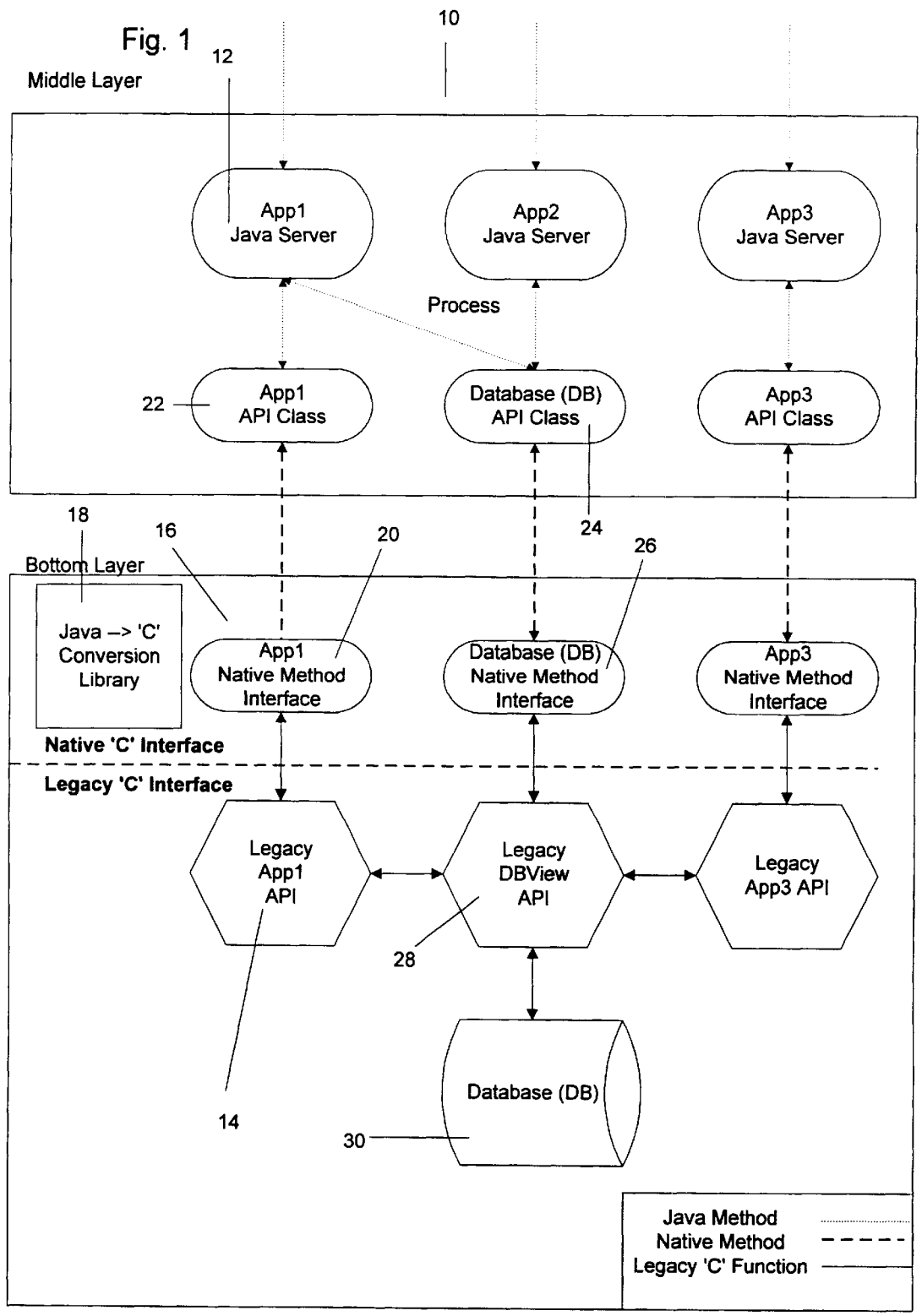

BI-DIRECTIONAL CONVERSION LIBRARY

This Application claims benefit of provisional application Ser. No. 60/061,338 filed Oct. 8, 1999.

FIELD OF THE INVENTION

This invention relates in general to a method for translating data structures used by a computer program written in a first computer programming language to equivalent data structures in a second computer programming language and more specifically for translating between the data structures of the two computer programming languages Java™ and C.

BACKGROUND OF THE INVENTION

In present day multi-platform computing environments, it is often a requirement that programs written in one language have to interact with programs written in another language (e.g. a computer program from Java™ making use of a C library). A prime difficulty with the interaction of programs written in different computer programming languages is the representation of data—each language stores information differently. If two programs are to interact, one program must convert the data from the representation used by the other program to its own.

The Java™ Native Interface (JNI) Application Programming Interface (API) is provided in the Java™ programming language to call C functions as if they were written in Java™. The Java™ Native Interface also provides a set of functions for converting primitive data types. While this is an elegant solution from a Java™ code perspective, it results in an interface which is extremely difficult to understand and to use from a C code perspective. It is well known in the art that typical computer programs use complex data structures built from the primitive data types. The JNI does not provide a method for automating the conversion of complex data structures. Also, complexity of this interface practically ensures that faults will find their way into applications where native methods are used. The danger presented by these faults is extreme since the native method interface allows C functions to access pointers to memory residing inside a Java™ virtual machine (VM).

The Java™ VM is intended to present an abstract, logical machine design free from the distraction of inconsequential details of any implementation. The memory areas of the Java™ virtual machine do not presuppose any particular locations in memory or locations with respect to one another. The memory areas need not consist of contiguous memory. However, the instruction set, registers, and memory areas are required to represent values of certain minimum logical widths (e.g. the Java™ stack is 32 bits wide). These requirements are discussed in the following sections.

The Java™ virtual machine is a machine which runs a special set of instructions which specify every possible instruction which may be implemented by the machine. The Java™ VM allows every computer to run Java™ applications. A pointer is a data item which specifies a location of another data item. Pointers are very unstable and therefore their use can lead to unstable computer operations, which can lead to a possible crash of the entire Java™ VM.

To reduce the complexity of implementing native methods, and to minimize the number of places where pointers to memory within the Java™ VM are accessed, the inventors have recognized the desirability of providing a means to convert objects (or even primitive data types) used in legacy function calls (i.e. function calls provided by existing programs). In software, a legacy system is an existing system to which new code is being added and a legacy function is a function used in such a system. By localizing this conversion to a single location, much of the danger inherent in the use of native methods can be mitigated.

SUMMARY OF THE INVENTION

According to the present invention, a bidirectional conversion library is provided which translates and converts data structures used in a first programming language to equivalent data structures of a second programming language, and vice versa. In the preferred embodiment, using Java™ and C as the first and second programming languages, respectively, the library of the present invention utilizes the Java™ Native Interface (JNI). The JNI is the interface between Java™ and any other computer programming language which is to be incorporated into Java™ applications during the conversion process. At the present time, only C and C++ are supported by the Java™ Native Interface. The bi-directional conversion library of the preferred embodiment may be implemented as an API provided by a Dynamic Link Library (DLL) for allowing Java™ data objects to access C functions via a mapping layer. Each DLL function takes a pointer to the JNI as a first parameter. By limiting the use of this pointer to a select set of functions, the problem inherent in the prior art Java™ Native Interface API of allowing C functions to access pointers to memory residing inside the Java™ VM is eliminated.

BRIEF DESCRIPTION OF THE DRAWINGS

A preferred embodiment of the invention is described below with reference to the sole drawing, in which:

FIG. 1 is a schematic illustration showing the process architecture for layered interaction between Java™ servers and legacy C code according to the preferred embodiment.

DETAILED DESCRIPTION OF THE PREFERRED EMBODIMENTS

FIG. 1 shows a preferred architecture for a Java™-to-C Conversion system 10. In this architecture, Java™ data objects 12 access legacy C functions 14 via a mapping layer 16. This layer 16 uses a bi-directional Java™-to-C conversion library 18 to convert Java™ data objects 12 into equivalent C structures 20 and calls an unmodified legacy C function 14. Each legacy API 14 requires an associated mapping layer 16, since mapping for each function may be different (e.g. a single Java™ data object 12 may map into multiple parameters in the function signature). The conversion library 18 provides a suite of functions to provide a consistent, well-defined approach to implementing the mapping layer 16. Also although the disclosure hereinafter describes mainly the conversion from Java™ to C in detail, it will be understood by a person skilled in the art how to convert data structures from C to Java™, or with appropriate substitutions of functions, convert between two other different computer programming languages.

In the following description of FIG. 1, a conversion from Java™ to C is disclosed using the preferred embodiment of the present invention. We will use a Java™ data object within App 1 12 as our focus for this description. The first action is that a method of the Java™ object App 1 12 is called by another Java™ process. After being called, depending on the call, it calls a method provided by its corresponding App 1 API class 22 or accesses a Database API class 24. After the App 1 API class 22 or the Database API class 24 has been accessed, the mapping or Native C layer 16 is accessed through a corresponding Native Method Interface, the APP 1 Native Method Interface 20 and a Database Native Method Interface 26 respectively. This means that the APP 1 API Class 22 calls the APP 1 Native Method Interface 20 and the Database API class 24 calls the Database Native Method Interface 26. The mapping layer 16 will take any Java™ data submitted from the calls from the API layer 22 located inside the middle layer and translate the Java™ data 12 into an equivalent C data structure. After translating the Java™ objects into equivalent C data structures, the Native Method Interface calls a corresponding legacy App 1 API 14. For the Database Native Method Interface 26, a call is made to a legacy Database view layer (DBView). If the legacy App 1 API 14 has been chosen, then it must access the legacy DBView API 28 since the legacy App 1 API requires the Database 30.

The conversion library 18 is an API provided DLL located within the Native C mapping layer 16 for linking a Java™ application to a C application by performing the necessary actions to translate Java™ data objects 12 to C data structures 14 and the complementary actions to translate C data structures 14 to Java™ data objects 12.

As discussed in greater detail below, the DLL implementing the conversion library 18 comprises four main groups of functions as follows: string functions, array functions, object/structure functions and field accessor/mutator functions. An accesor is a method or function that returns the value of encapsulated data while a mutator performs a complementary action setting a value of encapsulated data. It should be noted that every DLL function of the conversion library 18 takes a pointer to the Java™ Native Interface environment as a first parameter. A pointer is a data item which specifies the location of another data item. Limiting the use of this pointer to the conversion library, instead of allowing native methods to access the memory of the Java™ VM directly decreases the chance of crashing the Java™ VM, as discussed briefly above.

The group of string functions provides means for converting between Java™ String objects and a null terminated array of char representation used in C. Six functions are provided: createJavaString, createJavaStringFromwide, allocCString, freeCString, allocCWideString, and freeCWideString. It should be noted that the names of these functions and of the ones set forth below may be changed and still perform the same function provided that the changes are made globally (i.e. throughout the program). The names used in computer programs are mainly for the benefit of the programmer as a reminder of what each separate function or procedure does. Using the string functions as an example, the first function createJavaString is named so as to clearly indicate that it creates a Java™ String. Thus for example, if all of the occurrences of the phrase name createJavaString in the program were changed to nothingcreated, a call of the nothingcreated function would still perform the original function of creating a Java™ String object. Therefore, the conversion library is not dependent on the name of the functions and the choice of names is also not restricted.

The createJavaString function creates a new Java™ string object based on a C string passed as a parameter. A parameter is information located in another part of the computer program which is needed in order to run the calling function. In this case, the parameter is the C string which is to be translated to Java™ by the conversion library of the present invention. The Java™ string need not be freed, since Java's™ garbage collection is responsible for managing the memory allocated for the string object. Freeing of a string returns memory back to the computer allowing it to be reused later. Java's™ garbage collection automatically determines when memory is no longer needed and frees the memory for later use. A representative API for the createJavaString function is as follows:

```
jstring createJavaString(
    JNIEnv * env,
    const char * cString );
```

The createJavaStringFromWide function creates a new Java™ string based on a wide C string passed as a parameter (i.e. a null-terminated array of unsigned short). This function is performed in a similar manner to the previously discussed createJavaString function and may be implemented by the following API:

```
jstring createJavaStringFromWide(
    JNIEnv * env,
    const unsigned short * cString );
```

The allocCString function creates a new C string based on a passed Java™ string object, and is the complement to the createcreateJavaString function. The returned string is declared to be a constant (const) since the string is allocated within the Java™ VM and therefore should not be modified. This is also consistent with the treatment of strings within Java™ where a Java™ string object is immutable. A representative API for allocating is as follows:

```
const char * allocCString(
    JNIEnv * env,
    jstring javaStr );
```

Since there is no garbage collection in C, all strings created with allocCString must be freed via a call to freeCString, which may be implemented by the following API:

```
void freeCString(
    JNIEnv * env,
    jstring javaStr,
    const char ** stringToFree );
        /* Note: pointer to a string */
```

The allocCWideString and freeCWideString functions perform analogous operations for wide C strings. The freeCString function takes a pointer to a string allocated via allocCString (const char **) as a parameter, not simply a string (const char *). This use of the pointer ensures that the freed string is not referenced a later time. Representative APIs for allocCWideString and freeCWideString are as follows:

```
const unsigned short * allocCWideString(
    JNIEnV * env,
    jstring javaStr );
void freeCWideString(
```

```
            JNIEnv * env,
            jstring javaStr,
            const unsigned short ** stringToFree );
                                    /* Note: pointer to a string */
```

The array functions provide means for converting between Java™ arrays and their C counterparts where both arrays of primitive data types and of objects are supported. Primitive data types are defined as data elements built-in to the computer language which represent a single piece of data (eg. a number). Examples of primitive data types include integers, float, and boolean. For the purposes of these functions, Java™ string objects are considered primitive data types, since a class description is not needed. Five functions are provided: createJavaPrimitiveArray, createJavaObjectArray, allocCPrimitiveArray, allocCStructureArray and freeCArray. The createJavaPrimitiveArray and createJavaObjectArray functions both create a Java™ array based on a C array passed in as a parameter. In each case, a size and type of the array must also be specified. In the case of creating an object array, a class descriptor for an associated class must also be provided. In a similar manner to Java™ string objects, Java™ arrays need not be freed, as they are garbage collected by the Java™ programming language. Representative APIs for this function are as follows:

```
jarray createJavaPrimitiveArray(
    JNIEnv * env
    char * arrayType,
    void * cArray,
    int cArrayLen );
jarray createJavaObjectArray(
    JNIEnv * env
    void * cArray,
    int cArrayLen,
    classDesc_t * classDesc );
```

The allocCPrimitiveArray and allocCStructureArray functions both create a C array based on a Java™ array passed as a parameter. The returned array is a copy of the associated Java™ array so that any changes made to this new C array are not reflected in the original Java™ array. For both functions, the type of array must be specified. In contrast to the Java™ array creation functions, the C array creation functions return the length of the allocated array via a numElements parameter. The allocCStructureArray function also requires the class descriptor describing the Java™ array elements passed as a parameter. Exemplary APIs for allocCPrimitiveArray and allocCStructureArray are as follows:

```
void * allocCPrimitiveArray(
    JNIEnv * env
    jarray javaArray,
    char * arrayType,
    int * numElements );
void * allocCStrucutreArray(
    JNIEnv * env,
    jarray javaArray,
    char * arrayType,
```

```
    classDesc_t * classDesc,
    int * numElements );
```

As is also the case with the string functions, since C does not provide garbage collection, the freeCArray function must be called to release memory associated with the allocated C array. The freeCArray function may be implemented by the following API:

```
void freeCArray(
    JNIEnv * env,
    jarray javaArray,
    char * arrayType,
    void ** CArray );
```

The object/structure functions are at the core of the Bi-Directional Conversion Library according tot he present invention. These functions are used to convert between Java™ objects and C structures. Four object/structure functions are provided: java2c, c2java, createEmptyJavaObject, and createJavaObjectFromStruct.

The java2c function fills a specified C structure with data contained in a Java™ object passed to the function according to an indicated class descriptor. An API for implementing the java2c function is as follows:

```
void java2c(
    JNIEnv * env
    jobject javaObj,
    void * cStruct
    classDesc_t * classDesc );
```

The c2java function performs the complementary action of copying the data within a C structure to a corresponding Java™ object according to an indicated class descriptor. A representative API for c2java is as follows:

```
void c2java(
    JNIEnv * env,
    jobject javaObj.
    void * cStruct,
    classDesc_t * classDesc );
```

It should be noted that the java2c and c2java functions of the preferred embodiment do not provide any facilities for converting static data members of a Java™ object.

The design of class descriptors is set forth herein below for use with the java2c and c2java functions of the conversion library according to the invention. The following description is predicated on the assumption that legacy C structures already exist, and that data in these structures is required in the Java™ programs or objects to be converted. The following steps illustrate the process of creating a Java™ class to parallel a C structure and describing the Java™ class via a class descriptor.

1) Identify the required C data structure (at the time of its creation, the library of the present invention assumes that legacy C structures already exist—otherwise, C and Java™ structures can be developed in tandem, as would be understood by a person of ordinary skill in the art).

2) Create a Java™ class with data members in a one-to-one correspondence with the C data structure identified in step 1 (even though this may not result in the best object-oriented design). This class must have a public default constructor defined. The default constructor is a constructor for a Java™ object which does not take in any parameters. It should also be noted that data members must not be class variables (i.e. not static data members). Any access specifiers can be used for data members (e.g. they can be private, protected or public).

3) Define an array of field descriptors, with one entry per data member of the Java™ class created in Step 2. The following is a brief description of the information which must be defined:

fieldName: name of a data member in the Java™ class fieldType: one of JTYPE__* as defined in java2c.h, discussed in greater detail below fieldOffset: an offset into the C structure of the associated field (use an "offsetof" macro provided by Microsoft's™ C compiler)

maxElems:
  if fieldType is JTYPE__STRING or JTYPE__WSTRING, this is the maximum string length in characters
  if fieldType is JTYPE__ARRAY or JTYPE__VARRAY, this is the maximum number of elements in the array arraySizeoffset: if fieldType is JTYPE__VARRAY, this is the offset the field in the C structure which contains the actual number of elements in the array. This allows an array with a certain maxElems to be occupied by fewer elements, as specified in another field of the structure fieldClassDesc—if fieldType is JTYPE__OBJECT ( className ), JTYPE__ARRAY ( JTYPE__OBJECT ( className ) ), or JTYPE__VARRAY ( JTYPE__OBJECT ( className ) ), this is a pointer to the class for className 4) Define a class descriptor with the following information:

className: the fully qualified Java™ class name using '/' as a class delimiter e.g. "ops/dbview/myDbclass"

numfields: the number of fields in the field descriptor array size: the size of the assoicated 'C' structure (use the "sizeof" macro).

fields: the array of field descriptors from 3)

An actual example of the steps involved in creating the Java™ class to parallel a following hypothetical C structure otherStruct_t and its corresponding otherClass is disclosed herein below:

```
typedef struct   {
char someString [ MAX__STR__LEN + 1 ];
    int numValues;
    otherStruct_t values [ MAX__VALUES ];
} info_t;
```

The following Java™ class could be created (other methods can be added—only the data members matter for this library):

```
public class Info   {
    private String someString = null;
    private int numValues = 0;
    private otherClass [ ] values =
        new otherClass [ MAX__VALUES ];
    public Info()
    {
        // create otherClass objects in values array
    }
}
```

The following exemplary fieldDesc_t (field descriptor array) and classDesc_t (class descriptor array) definitions are defined:

```
fieldDesc_t infoFields [ ] = {
    { "someString",
        JTYPE__STRING,
        offsetof ( info_t, someString ),
        MAX__STR__LEN + 1,
        0,         // not applicable for this field type
        NULL    }, // not applicable for this field type
    { "numValues",
        JTYPE__INT,
        offset ( info_t, numValues ),
        0,         // not applicable for this field type
        0,         // not applicable for this field type
        NULL    }, // not applicable for this field type
    {   "values",
        JTYPE VARRAY ( JTYPE OBJECT ( "otherClass" )
),
        offsetof ( info_t, values ),
        MAX__VALUES,
        offsetof ( info_t, numvalues ),
        &classDescForOtherClass }
};
    classDesc_t infoClassDesc = {
        "Info",
        sizeof ( infofields ) / sizeof ( fieldDesc_t
), // num fields
        sizeof ( infor_t )
        infoFields };
```

The createEmptyJavaObject function creates a new Java™ object of a specified class in a className parameter based on a default constructor. The data members of a newly created object are not assigned any values unless a default constructor performs initialization. A representative API for this function is as follows:

```
jobject createEmptyJavaObject(
    JNIEnv * env
    char * className );
```

The createJavaObjectFromStruct function creates a new Java™ object based on a specified class descriptor. The data members of the new Java™ object are initialized with the values contained in a C structure passed in as a cStruct parameter. The createJavaObjectFromStruct function may be implemented by the following API:

```
jobject createJavaObjectFromStruct(
    JNIEnv * env,
    void * cStruct,
    classDesc_t * classDesc );
```

It should be noted that both of the createEmptyJavaObject and createJavaObjectFromStruct functions each create a Java™ object using a default constructor. The default constructor must be defined for all objects to be created via the conversion library DLL of the present invention. If a constructor other than the default constructor is required, the JNI NewObject function must be chosen.

Often, not all of the data members of an object passed to a native method are required. The field accessor/mutator functions discussed below allow individual fields of an object to be read (via an accessor function) or modified (via a mutator function). None of these functions require a class descriptor to be defined. It should be noted that field accessor/mutator functions do not provide any facilities for accessing or changing static data members of a Java™ object.

Two sets of accessor/mutator pairs are provided in accordance with the preferred embodiment: get<Primitve Type>Field/set<Primitive Type>Field and getObjectField/setObjectField.

The get<Primitive Type>Field/set<Primitive Type>Field pair of functions provide means to access and modify primitive data members of a Java™ object based on their names. Each primitive type has its own pair of accessor/mutator functions, each of which returns a value of the appropriate C type. The supported types are summarized below:

| Field Type | <Primitive Type> in Function Name | Return/Parameter Type |
|---|---|---|
| JTYPE_INT | Int | int |
| JTYPE_LONG | Long | __int64 |
| JTYPE_SHORT | Short | short |
| JTYPE_BYTE | Byte | char |
| JTYPE_WCHAR | Wchar | unsigned short |
| JTYPE_CHAR | Char | unsigned char |
| JTYPE_FLOAT | Float | float |
| JTYPE_DOUBLE | Double | double |
| JTYPE_BOOLEAN | Boolean | boolean |
| JTYPE_STRING | String | jstring |

The string type is a special case, since in Java™ it is a class, where as in C it is a primitive array. The bi-directional conversion library of the present invention treats the string as a primitive type (since a class descriptor is not required), but the Java™ string value returned cannot be used directly by the Ccode. The allocCString and freeCString functions must be used to allocate and free C-style strings. It should be noted that primitive data types are basic field types such as boolean, integer or byte.

The get<Primitive Type>Field/set<Primitive Type>Field functions may be implemented by the following exemplary APIs:

```
<Native Type> get <Primtive Type>Field(
    JNIEnv * env,
    jobject javaObj,
    char * fieldName );
void set<Primitive Type>Field(
    JNIEnv * env,
    jobject javaObj,
    char * fieldName,
    <Native Type> value );
```

The getObjectfield and setObjectfield functions allow embedded objects to be accessed and modified. In addition to a field name in the Java™ object, the type of the object must also be specified. A JTYPE_OBJECT (className) macro can be used to formulate the type specifier. A skilled person will recognize that care should be taken when using the object accessor/mutator functions since the getObjectfield function returns a reference to an actual embedded object, and not a copy of the object. The setObjectField replaces the reference to an existing embedded object with a reference to the new copied object. Typical usage of these functions would include using the getObjectField to retrieve a reference to an object, and then to use the java2c, c2java or a field accessor/mutator pair to manipulate the data. Since a reference to an original object is used, the setObjectField function need not be called (since it would merely change the reference back to the same object). If a new object is created via the createEmptyJavaObject or createJavaObjectFromStruct functions, the setObjectfield function should be used to replace the existing embedded object with the new object. Exemplary APIs for the getObjectField and setObjectField functions are as follows:

```
jobject getObjectField(
    JNIEnv * env,
    jobject javaObj,
    char * fieldName,
    char * fieldType );
void setObjectField(
    JNIEnv * env,
    jobject javaObj,
    char * fieldName,
    char * fieldType,
        jobject value );
```

It will be appreciated that, although one particular embodiment of the invention has been described in detail, various changes and modifications may be made. For example, in the mapping layer, the conversion functions could be directly integrated into legacy C code. Also, although not provided by the implementation set forth herein, the mapping of primitive data types may be included in the conversion. Although the preferred embodiment provides for embedded objects to be embedded within themselves alternative embodiments are contemplated which do not support embedded objects or reference them to external structures. With respect to the mapping of arrays, embodiments are possible which do not to provide array mapping functions or array accessor/mutator functions. It is contemplated that access may be provided to Java™ Object Methods, as would be understood by a person of ordinary skill in the art. Furthermore, although the detailed description of the preferred embodiment herein above is limited to a discussion of the conversion between Java™ and C, it will be appreciated that conversions are possible between any two different computer languages according to the principles of the present invention, and in particular C can be converted into Java™. All such changes and modifications may be made without departing from the sphere and scope of the invention as defined by the claims appended hereto.

What is claimed is:

1. A bi-directional conversion library for converting data structures from a first programming language into data structures of a second programming language, comprising:

a) a plurality of string functions for creating new string objects in said first and second programming languages based on string parameters passed thereto from said second and first programming languages, respectively;

b) a plurality of array functions for creating new array objects in said first and second programming languages based on array parameters passed thereto from said second and first programming languages, respectively;

c) a plurality of object/structure functions for copying data between an object of said first programming language and a data structure of said second programming language according to predetermined indicated class descriptors and for creating new objects in said first programming language based on one of either a default constructor or a specified data structure of the second programming language according to a specified class descriptor; and d) a plurality of field accessor/mutator functions for reading and modifying individual fields of an object in said first and second programming languages, wherein said first programming language is Java™ and said second programming language is C, and wherein Java™ includes a Java™ Native Interface (JNI) facility, and wherein each of said functions takes a pointer to said Java™ Native Interface (JNI) environment has a first parameter.

2. The bi-directional conversion library of claim 1, wherein one of said string functions creates a new Java™ string object based on a C string passed to said function as a parameter.

3. The bi-directional conversion library of claim 1, wherein one of said string functions creates a new Java™ string object based on a wide C string passed to said function as a parameter.

4. The bi-directional conversion library of claim 1, wherein one of said string functions creates a new C string based on a Java™ string object passed to said function as a parameter.

5. The bi-directional conversion library of claim 1, wherein one of said string functions creates a new wide C string based on a Java™ string object passed to said function as a parameter.

6. The bi-directional conversion library of claim 4 or 5, wherein one of said string functions frees said new C string for releasing memory allocated for said new C string.

7. The bidirectional conversion library of claim 1, wherein one of said array functions creates a new Java™ array based on a C array passed to said function as a parameter.

8. The bi-directional conversion library of claim 1, wherein one of said array functions creates a new C array based on a Java™ array passed to said function as a parameter.

9. The bi-directional conversion library of claim 8, wherein one of said array functions frees said new C array for releasing memory allocated for said new C array.

10. The bi-directional conversion library of claim 1, wherein one of said object/structure functions fills a predetermined C structure with data contained in a Java™ object passed to said function according to a predetermined one of said indicated class descriptors.

11. The bi-directional conversion library of claim 1, wherein one of said object/structure functions copies data within a predetermined C structure to a corresponding Java™ object according to a predetermined one of said indicated class descriptors.

12. The bi-directional conversion library of claim 1, wherein one of said object/structure functions creates a new Java™ object of a specified class in a className parameter based on a default constructor.

13. The bi-directional conversion library of claim 1, wherein one of said object/structure functions creates a new Java™ object based on a specified C data structure according to a specified class descriptor.

14. The bi-directional conversion library of claim 1, wherein one pair of said field accessor/mutator functions provides access to and modification of primitive data members of a Java™ object based on names of said data members.

15. The bi-directional conversion library of claim 1, wherein one pair of said field accessor/mutator functions provides access to and modification of embedded Java™ objects.

16. An Application Programming Interface (API) comprising the bi-directional conversion library of claim 3 implemented as a Dynamic Library Link (DLL) for linking a first application written in said first object-oriented language with a second application written in said second object-oriented language.

* * * * *